United States Patent [19]

Parsley et al.

[11] Patent Number: 5,008,795
[45] Date of Patent: Apr. 16, 1991

[54] SWITCHED CAPACITOR INTERLEAVED FORWARD POWER CONVERTER

[75] Inventors: David W. Parsley, Draper, Utah; Hubert C. Martin, Jr., Temecula, Calif.

[73] Assignee: Unisys Corporation, Blue Bell, Pa.

[21] Appl. No.: 498,863

[22] Filed: Mar. 23, 1990

[51] Int. Cl.⁵ .......................................... H02M 3/335
[52] U.S. Cl. ........................................ 363/20; 363/71
[58] Field of Search ................ 363/16, 20, 21, 24–26, 363/133, 134, 71

[56] References Cited

U.S. PATENT DOCUMENTS

| | | | |
|---|---|---|---|
| 4,618,919 | 10/1986 | Martin, Jr. | 363/16 |
| 4,674,019 | 6/1987 | Martinelli | 363/20 |
| 4,685,039 | 8/1987 | Inou et al. | 363/16 |
| 4,713,742 | 12/1987 | Parsley | 363/124 |
| 4,734,839 | 3/1988 | Barthold | 363/16 |

Primary Examiner—Peter S. Wong
Attorney, Agent, or Firm—Arnold L. Albin; Glenn W. Bowen; Mark T. Starr

[57] ABSTRACT

A DC-to-DC power converter topology utilizing parallel connected transformers in a buck switching configuration with each stage operated 180° out-of-phase, with the primary windings of the transformers sequentially feeding into a common filter capacitor. On each transformer, a secondary winding is switched to a load at the time the primary winding is shunted across the filter capacitor. The circuit provides dual inductor buck power stage operation while maintaining input-output isolation. Interleaved power processing provides continuous capacitance support for the output voltage produced by the power supply.

8 Claims, 4 Drawing Sheets

SWITCHED CAPACITOR INTERLEAVED FORWARD POWER CONVERTER

BACKGROUND OF THE INVENTION

1. Field of the Invention

The invention relates to DC-to-DC converters of the forward type. More particularly, the invention relates to forward power converters utilizing interleaved timing in a multiple winding dual-inductor buck switching configuration.

2. Description of the Prior Art

Converter topologies for DC-to-DC conversion commonly realized may be classified into the buck, boost and buck-boost switching regulators. Such converters may include a semiconductor switching element which when turned on and off couples energy from a DC source to an inductor in the converter. This energy is then transferred from the inductor to the DC output. Common DC-to-DC converter topologies include the buck (or forward) converter, the buck-boost (or flyback) converter, and the boost converter topologies.

In the conventional buck converter, a semiconductor switch is coupled between the DC supply input and the inductor, which in turn is connected to the DC output. A diode, normally reverse-biased, is coupled at a junction between the switch and the inductor to ground, polarized so that it is non-conductive when the semiconductor switch is closed. A capacitor is then connected between the output and circuit ground. During normal operation of the conventional buck converter, closing the semiconductor switch impresses the difference of the input voltage and output voltage across the inductor, causing the current in the inductor to increase and charging the output capacitor while also delivering current to any load connected to the output. When the semiconductor switch is turned off, the voltage at the junction between the switch and the inductor decreases until the diode is forward-biased. Current then flows through the diode and the inductive element with a decreasing amplitude, until the switch is closed and the cycle repeated.

An improved converter of the buck switching type is described in U.S. Pat. No. 4,713,742, "Dual-Inductor Buck Switching Converter", invented by David W. Parsley and assigned to the assignee of the present invention. In that invention a DC-to-DC power converter provided two parallel-connected inductors in series with a DC input power source. A commutation switch was connected in series with each of the inductors. The commutation switches were controlled so that they have a duty cycle that is greater than 50%. The duty cycle provides interleaved timing such that whenever one of the switches turns on or off, the other switch is engaged during the switching time. As a result of this construction, the sum of the currents that flow through the inductors provides an output current to the load with greatly reduced ripple and substantially constant output current. Further, the overlapping currents drawn from the power line result in harmonics of reduced amplitude and higher frequency content, thus permitting reduced size filter components to minimize input current harmonics. However, the aforesaid Parsley patent required a common connection between the input and output power supplies, therefore providing an output of only a single polarity.

In U.S. Pat. No. 4,618,919, "Topology for Miniature Power Supply with Low Voltage and Low Ripple Requirements", invented by H.C. Martin, Jr., also assigned to the assignee of the present invention, a dual transformer switching topology provided isolation of the input and output power terminals. Further, a storage capacitor applied at the input of the power supply was switched sequentially in accordance with an interleaved timing to provide continuous filter support for the output voltage produced by the power supply. The capacitor performs the filtering function for the output voltages and also stores energy at high voltages as a result of the turns ratio of the power supply transformer, thereby permitting use of a capacitor with reduced physical size and capacity. The Martin patent was of the interleaved flyback converter type which, however, lacks inherent stability over a wide band of attenuation of input ripple.

The present invention is of an interleaved forward converter and as compared to conventional buck converters produces smaller ripple currents to be filtered by the filter capacitor, thus permitting a reduction in size of that element. Since the AC current components are reduced, smaller switching losses will be experienced. The invention provides a wider band attenuation of input ripple than an interleaved flyback regulator because of the greater inherent stability of the buck derived topology over buck-boost derived topologies. Two buck switching power stages are operated 180° out-of-phase, with the input nodes of the inductors coupled to a common filter capacitor. On each inductor core, a secondary coil is wound which is switched to a load at the time the primary winding is shunted across the input filter capacitor. In this way, dual-inductor buck power operation is provided while maintaining input-output isolation. The circuit provides DC-to-DC power conversion with isolation between input and output at high efficiency and high power density.

SUMMARY OF THE INVENTION

The invention comprises a DC-to-DC interleaved timing forward converter that functions as a power supply for applying a first voltage from an input power source to an output load at a second voltage. It utilizes a pair of transformers sequentially connected to an input capacitor, which performs the filtering functions for the output signals, and to the output load. In particular, it comprises first and second electrical transformers having a predetermined turns ratio, a capacitor sequentially coupled to both the first and second transformers for filtering the input and output voltages, and a switching circuit for selectively switching the first and second transformers between the input power source and the output load, so that the capacitor, which intermittently stores energy returned from the transformer inductances, applies a potential to the first transformer during a first time interval when the transformer is not connected to the input power source and applies a potential to a second transformer opposing the input voltage during that time interval, and so that the capacitor also applies a potential to the second transformer during a second time interval when the second transformer is not connected to the input power source and also applies a potential to the first transformer opposing the input voltage during the second time interval, the switching circuit being arranged so that the first and second transformers are connected to the output load in time interleaved fashion.

DESCRIPTION OF THE PREFERRED EMBODIMENT

Figure 1:
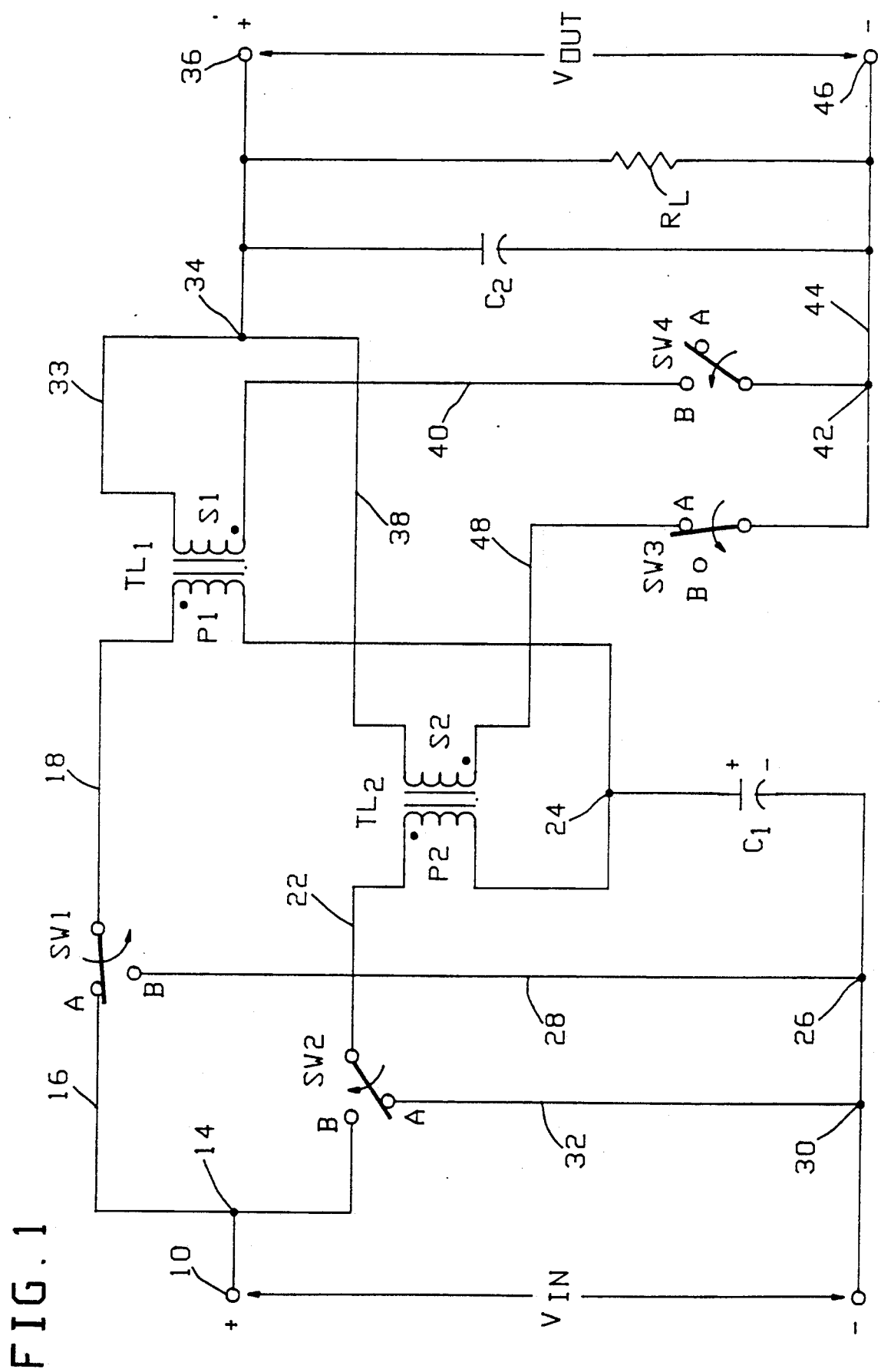
FIG. 1 is a schematic diagram of a preferred embodiment of the power supply of the present invention.

Referring now to FIG. 1, there is shown a schematic diagram for a power supply in accordance with the present invention. An input signal $V_{IN}$ from an external power source, which may be any suitable voltage, such as 28 volts, is applied to input terminals 10 and 12. The anode or positive side of the input power source is connected from node 14 through lead 16 and terminal A and the blade arm of switch SW1 to lead 18 which connects to one terminal of the primary winding P1 of transformer $TL_1$. Node 14 is also connected through lead 20 to terminal B of a second switch SW2 and through the blade arm thereof to lead 22 and the primary winding P2 of a second transformer $TL_2$. The other terminals of primary windings P1 and P2 are connected to a common node 24 and to one terminal of a capacitor $C_1$. The second terminal of capacitor $C_1$ is connected to node 26 and from lead 28 to terminal B of switch SW1. Node 26 is also connected to node 30 and via lead 32 to terminal A of switch SW2. Node 30 further connects to terminal 12 at the power supply input.

One terminal of the secondary winding S1 of transformer $TL_1$ is connected via lead 33 to a node 34. Node 34 also connects via lead 38 to one terminal of the secondary winding S2 of transformer $TL_2$. Node 34 further connects to an output terminal 36 to which a load $R_L$ and a further filter capacitor $C_2$ are optionally shown. The other terminal of secondary winding S1 is connected via lead 40 to the B terminal of switch SW4. Terminal A of SW4 is open circuited. The blade element of switch SW4 is connected to a node 42 and via a lead 44 to the output terminal 46 which in turn may be connected to the load $R_L$ and capacitor $C_2$. A second terminal of the secondary winding S2 of transformer $TL_2$ is connected by lead 48 to terminal A of switch SW3. Terminal B of switch SW3 is open circuited, while the switch blade is connected via node 42 and lead 44 to output terminal 46.

The operation of the invention will now be described with respect to FIGS. 2 and 3, with continued reference to FIG. 1. For purposes of illustration, it will be assumed that the system has reached an equilibrium and has been operating for a period of time. Connection of switch SW1 or SW4 to its A terminal shall constitute an ON condition for the switch; connection to B, an OFF condition. For SW2 or SW3, ON is denoted by a B connection; OFF by an A connection. Parasitic resistances, reactances and transition times are neglected, also for purposes of illustration, though they appear in any implementation of the converters.

As shown in FIG. 1, in the initial condition, switch SW1 is connected to the A terminal while switch SW2 is also connected to its A terminal. Switches SW3 and SW4 are connected to their respective A terminals. Switches SW1, SW2, SW3 and SW4 are controlled by a control circuit (not shown) such as the switch driver circuit of U.S. Pat. No. 4,618,919, referenced above, and incorporated herein by reference. The sequential operation of the switches is shown in FIG. 2. A 40% duty cycle is shown, but this is exemplary and not to be considered limiting. Further, while an interleave factor of 100% has been illustrated, which yields the maximum efficiency with respect to filtering with a capacitor at the input side of the tranformers, other interleave factors which allow overlap of transformer operation are also useful, but will result in reduced filter capacitance effectiveness, and thus may require additional capacitance at the output of the supply. Switches SW1 and SW2 are in the opposite state, or effectively 180° out-of-phase, for a substantial period of time. Thus, for a one microsecond period, corresponding to an operating frequency of 1 MHz, switch SW1 is ON (i.e., connected to terminal A and the power source) for a period of 400 nS and OFF (i.e., connected to terminal B and power return) a period of 600 nS. Similarly, switch SW2 has an ON period of 400 nS and an OFF period of 600 nS, with the ON and OFF periods 180° out-of-phase with those of switch SW1. In a like manner, switches SW3 and SW4 are also operated 180° out-of-phase; however, these switches are ON (connected to terminal A) for a period of 600 nS and OFF (connected to terminal B) for a period of 400 nS. It should be noted that the ON periods of the switches SW3 and SW4 overlap so that there is continuous connection through at least one of the transformers $TL_1$ or $TL_2$ to the load $R_L$. It may also be seen that switches SW1 and SW4 are effectively 180° out-of-phase as are switches SW2 and SW3.

With switches SW1 and SW2 in the initial condition shown in FIG. 1, the voltage $V_{IN}$ is applied across the series combination of the primary P1 of transformer $TL_1$ and capacitor $C_1$. For a transformer with a turns ratio of 1:1, the voltage across capacitor $C_1$ is equal to the output voltage $V_{OUT}$. Therefore, referring to FIG. 3 at reference numeral 50, the voltage applied to the primary P1 of transformer $TL_1$ is the quantity $V_{IN}-V_{OUT}$. It may be seen that the capacitor voltage is also applied across the primary P2 of transformer $TL_2$ through switch SW2. However, since the capacitor is negatively charged with respect to the polarity dot of primary P2, there results a negative applied voltage $V_{P2}$. At this time, the current in primary winding P1 increases substantially linearly as shown by the solid line for curve IP1. The solid line represents a no-load condition while the dashed line represents a full load condition. In a no-load condition, when the primary winding P1 is placed across the input power supply $V_{IN}$ for a predetermined period of time, i.e., a 40% duty cycle, current is caused to flow through the coil. Under no load conditions, this energy is stored in the inductance and transferred to the capacitor when the blade of switch SW1 connects lead 18 to contact B. Thus, during the constant switching cycle, some of the energy from the capacitor C1 will be transferred into the transformer windings and conversely, energy from the transformer windings will be transferred to the capacitor. When a load is connected to the circuit, more current is drawn through the primary winding P1 as shown by the shift in DC level of the dotted line. Thus, the circuit is delivering some of the energy to the load when the switch is connected to capacitor C1, rather than putting all the energy into the primary winding.

When the blade of switch SW1 transfers to terminal B and the blade of switch SW2 transfers to its terminal B, the steady-state voltage previously stored in capacitor C1 is now impressed across the primary winding P1 but in a polarity opposite relative to $V_{IN}$. The voltage $V_{IN}$ is also applied across coil P2 in series with capacitor C1. The voltage developed across capacitor C1 is shown at reference numeral 52 of waveform $V_{P1}$. Similarly, the voltage applied to the primary P2 of transformer $TL_2$ is shown at reference numeral 54 of waveform $V_{P2}$. The current in coil P1 then decreases linearly while the current in coil P2 increases linearly, assuming a no-load condition, whereby the currents in coils P1 and P2 is substantially a sawtooth waveform as shown in FIG. 3. Further, the voltage across capacitor C1 is reflected through transformer $TL_1$ to the secondary winding S1. When the blade of switch SW3 is at position A, and the blade of switch SW4 is at position A, the voltage impressed on capacitor C is reflected through transformer $TL_2$ to output terminals 36 and 46. When the blades of switches SW3 and SW4 transfer to the B position, the energy stored in capacitor C1 is applied to transformer $TL_1$ and again appears across terminals 36 and 46. Since, as shown in FIG. 2, the conduction periods of switches SW3 and SW4 overlap, continuous support is provided by capacitor C1 for the output signal regardless of the position of switches SW3 and SW4.

Figure 2:
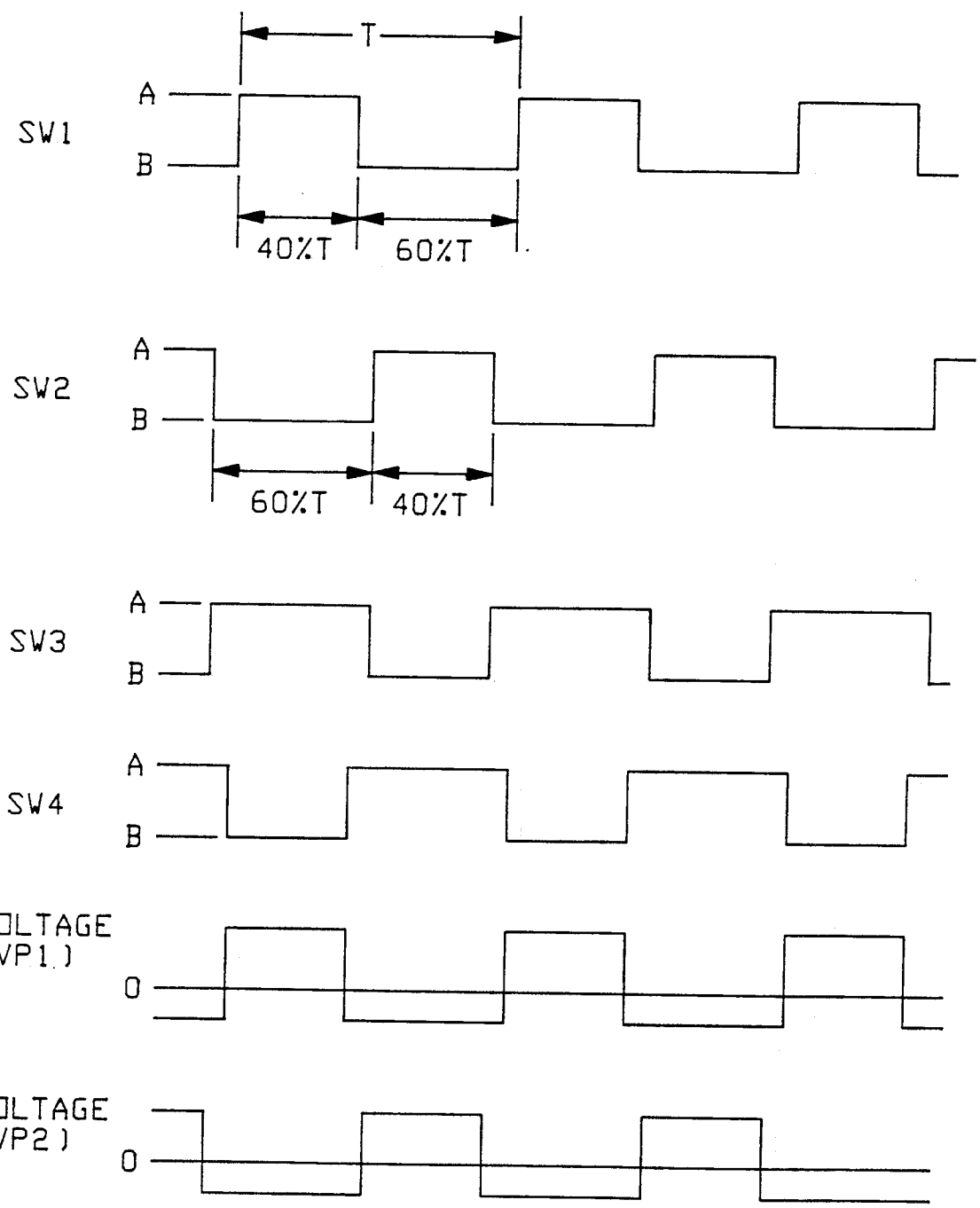
FIGS. 2 and 3 are timing diagrams showing waveforms useful in understanding the operation of the power supply of the present invention.
Figure 3:
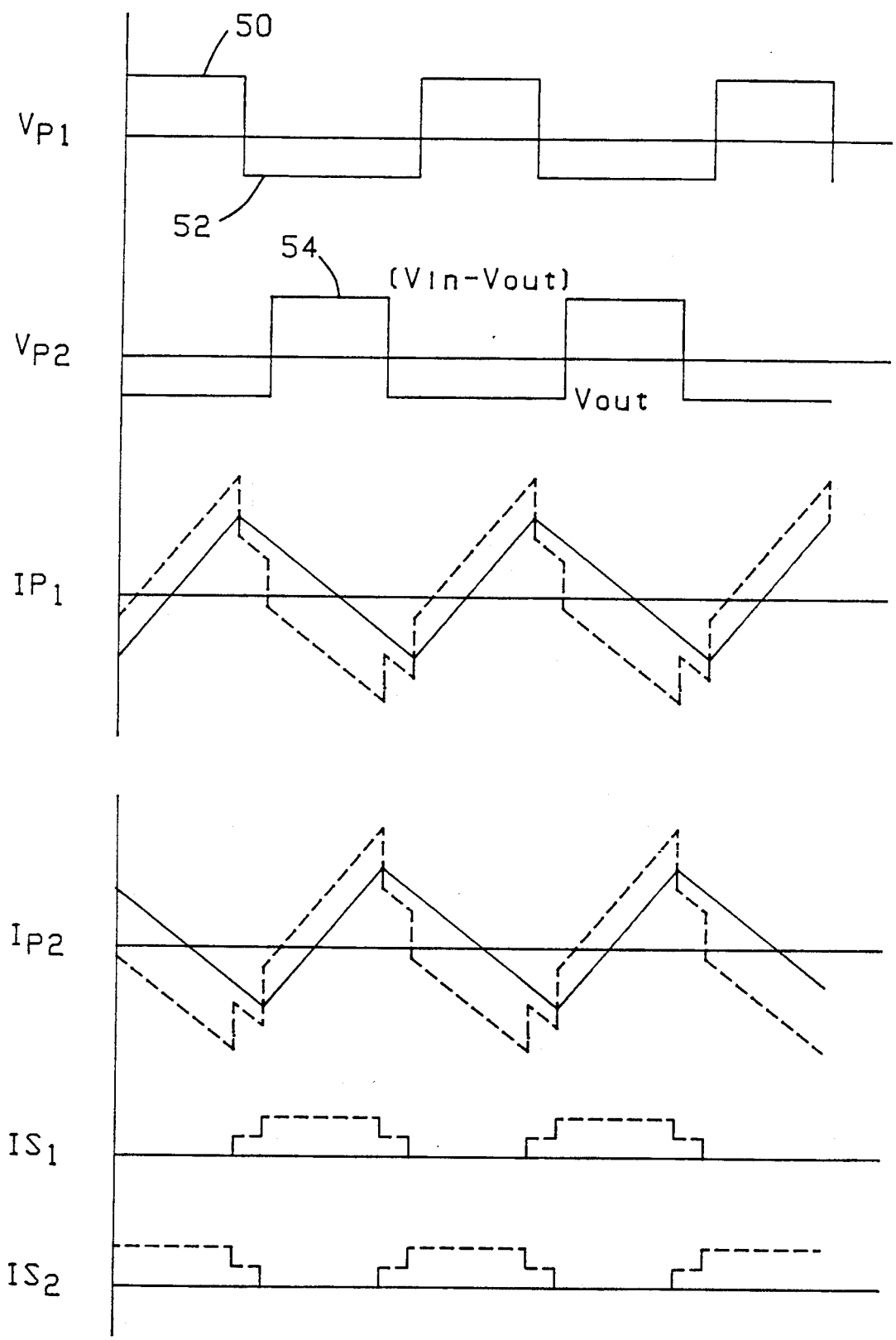

Because of the symmetry of the circuit, the same operation occurs relative to transformers $TL_1$ and $TL_2$ when the switches are synchronized as shown in FIG. 2. The interleaved timing of the operation of the switches SW1 and SW2 is arranged so that at least one of the switches is always connected to the respective B terminal. Thus, capacitor C1 is always providing support to the output voltage, and the load current is supplied by one or the other of the two transformers, depending which of switches SW1 and SW2 is at position A. As noted above, while 100% interleaved operation is desirable, since it reduces the need for output filter capacitor C2, other interleave and duty cycles are also operable.

It may be seen from FIG. 2 that switches SW3 and SW4 can be connected to their respective A and B terminals simultaneously during a portion of the cycle. This results in a current sharing of the stored energy and a staircase step in the currents through the respective secondary winding $IS_1$ and $IS_2$ of FIG. 3.

If desired, an additional filter capacitance $C_2$ may be applied across the output terminals 36 and 46. So long as the circuit operates with substantially 100% interleave factor, the value of capacitor C2 may be substantially less than capacitance C1, and the circuit will operate as described above.

Figure 4:
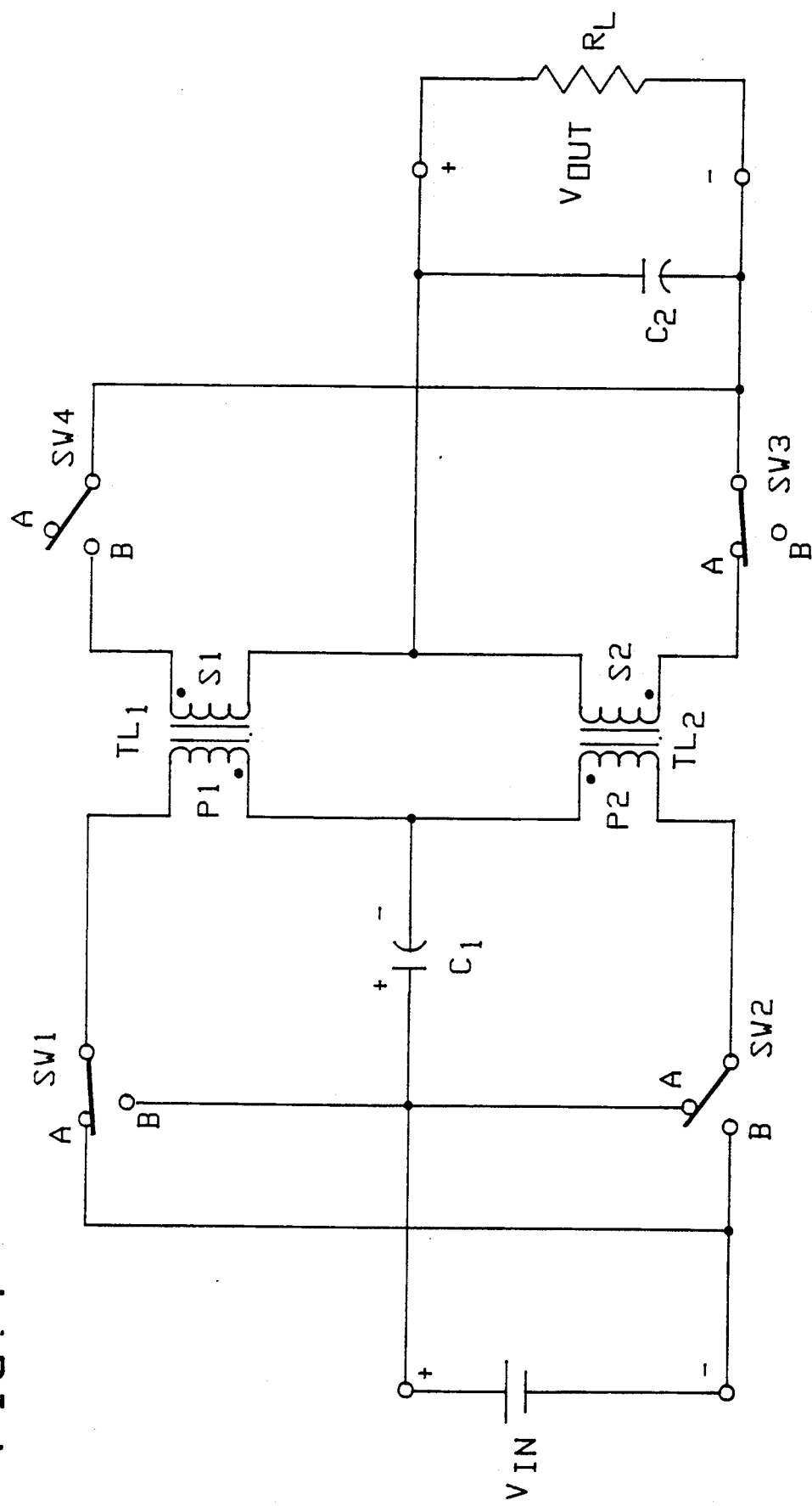
FIG. 4 is a schematic diagram of an alternate embodiment of the power supply of the present invention.

FIG. 4 shows an alternate preferred embodiment of the invention in which capacitor C1 has been reconfigured to be isolated from ground. While the configuration of FIG. 1 permits easy feedback regulation off of C1 if desired, to eliminate need for an isolated feedback signal, the circuit of FIG. 4 may simplify the switch drive circuitry.

The present invention thus provides a DC-to-DC power converter of the interleaved forward converter type which provides the advantages of the multiple winding dual inductor buck topology while allowing isolation between the input power source and the output voltage. Interleaved timing provides capacitive support for the load while reducing the magnitude of filter capacitance required and the current ripple reflected to the power source. The buck configuration provides stability over a wide load operating range. Only minimal output filtering is required. Utilization of the transformer turns ratio permits reduction in size of the filter capacitance, at the expense of increasd applied voltage. The dual inductor interleaved operation reduces AC ripple and the amount of capacitance required to satisfy a given output ripple specification.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A DC-to-DC interleaved timing forward converter for applying a first voltage from an input power source to an output load at a second voltage, comprising:

first and second electrical transformers having a predetermined turns ratio, a capacitor sequentially coupled to both said first and second transformers for filtering said first and second voltages, and switch means for selectively switching aid first and second transformers alternately and sequentially to said input power source, said capacitor, and said output load, so that said capacitor applies a first potential to said first transoformer during a first time interval when said first transformer is not connected to said input power source by said switch means, and also applies said first potential to said second transformer opposing said first voltage during said first time interval, and so that said capacitor applies a second potential to said second transformer during a second time interval when said second transformer is not connected to said input power source by said switch means and also applies said second potential to said first transformer opposing said first voltage during said second time interval, said switch means being further arranged so that said first and second transformers are connected to said output load in time interleaved fashion, said first electrical transformer compring a primary winding and a secondary winding, said second electrical transformer comprising a primary winding and a secondary winding, each of said transformers being connected with an opposing polarity sense between said primary winding and said secondary winding, and with the same polarity sense, respectively, with respect to said input power source and with respect to said load, wherein said switch means further comprises:

first switch means for connecting said primary winding of said first electrical transformer to said input power source in a first position and to said capacitor in a second position, and second switch means for connecting said primary winding of said second electrical transformer to said input power source in a first position and to said capacitor in a second position, said first and second switch means operatively engaged so as to apply said input power source to said primary winding of said first and second electrical transformers in time phase opposition so as to minimize current deviations of said input power source.

2. A converter as set forth in claim 1, said switch means further comprising:

third switch means for coupling said secondary winding of said first electrical transformer to said input power source in a first position and decoupling said secondary winding in a second position, and fourth switch means for coupling said secondary winding of said second electrical transformer to said input power source in a first position and decoupling said secondary winding in a second position, said third and fourth switch means operatively engaged in accordance with predetermined positions of said first and second switch means, said first switch means being engaged in time phase opposition with said fourth switch means, said second switch means being engaged in time phase opposition with said third switch means.

3. A converter as set forth in claim 2, wherein said capacitor has a first terminal connected to said primary windings of said first and second electrical transformers and a second tenminal connected to said input power source.

4. A converter as set forth in claim 3, wherein said predetermined turns ratio is unity.

5. A converter as set forth in claim 3, wherein said predeterming turns ratio is step down from primary to secondary.

6. A converter as set forth in claim 3, wherein said first, second, third, and fourth switches comprise semiconductor switching elements, and further comprising control means for synchronously activating said switches in accordance with a predetermined duty cycle.

7. A converter as set forth in claim 6, wherein said first and second time intervals have a predetermined overlap.

8. A converter as set forth in claim 7, wherein said predetermined overlap has a null value, such that said first and second time intervals provide an interleave of 100%.

* * * * *